(12) United States Patent
Hsueh

(10) Patent No.: US 7,577,776 B2
(45) Date of Patent: Aug. 18, 2009

(54) MULTIPLE VIRTUAL USB DEVICES WITH VIRTUAL HUB IMPLEMENTED USING ONE USB DEVICE CONTROLLER

(75) Inventor: Chao-Hsuan Hsueh, Shijr (TW)

(73) Assignee: Aten International Co., Ltd, Shijr (TW)

( * ) Notice: Subject to any disclaimer, the term of this patent is extended or adjusted under 35 U.S.C. 154(b) by 198 days.

(21) Appl. No.: 11/748,488

(22) Filed: May 14, 2007

(65) Prior Publication Data
US 2008/0288708 A1    Nov. 20, 2008

(51) Int. Cl.
*G06F 13/12* (2006.01)
(52) U.S. Cl. ............................. 710/62; 710/65; 710/72; 710/74
(58) Field of Classification Search .................. None
See application file for complete search history.

(56) References Cited

U.S. PATENT DOCUMENTS

| | | | |
|---|---|---|---|
| 2001/0018646 A1* | 8/2001 | Nagashima et al. ........... 703/13 |
| 2003/0041205 A1* | 2/2003 | Wu et al. ..................... 710/302 |
| 2004/0203415 A1* | 10/2004 | Wu ............................. 455/66.1 |
| 2005/0204026 A1 | 9/2005 | Hoerl |
| 2008/0071962 A1* | 3/2008 | Yang et al. ................... 710/313 |
| 2008/0215773 A1* | 9/2008 | Christison et al. ............. 710/62 |

* cited by examiner

*Primary Examiner*—Eron J Sorrell
(74) *Attorney, Agent, or Firm*—Chen Yoshimura LLP

(57) ABSTRACT

A USB device using one USB device controller to simulate multiple virtual USB devices with a virtual USB hub is described. The USB device controller is assigned a USB address and communicates with the USB host under the control of an MCU and its firmware. The USB device also includes a CPLD (or FPGA or ASIC) and an analog switch for filtering the USB packets from the host and replacing the address in the packet by a fixed address before sending the packet to the USB device controller. The address in the original packet is stored in the CPLD and accessible by the MCU. The MCU controls the USB device controller to simulate one or more USB hubs and multiple USB devices.

20 Claims, 4 Drawing Sheets

MULTIPLE VIRTUAL USB DEVICES WITH VIRTUAL HUB IMPLEMENTED USING ONE USB DEVICE CONTROLLER

BACKGROUND OF THE INVENTION

1. Field of the Invention

This invention relates to USB (Universal Serial Bus) devices, and in particular, it relates to a USB device using one USB device controller to simulate multiple virtual USB devices and a virtual USB hub.

2. Description of the Related Art

Conventional USB devices typically use one USB device controller chip for each USB device, and the host computer (e.g. a PC) assigns an address to each USB device. If multiple USB devices are desired, a USB hub is typically required. FIG. 1 shows an example of a USB hub 2 connected to a host computer 1. The USB hub 2 simulates four downstream USB ports, and can control four USB devices. In this example, a USB device 5 (e.g. flash drive, etc.) can be directly plugged to a USB port of the hub 2, or an end user device 4 (e.g. PDA, digital camera, etc.) can be plugged to a USB port of the hub 2 via a cable 3. The cable 3 may be a USB to RS-232 adaptor cable (which is a USB device) with one connector 3a for plugging into an USB port and the other connector 3b for plugging into an RS-232 port of the end user device 4.

SUMMARY OF THE INVENTION

The present invention is directed to an USB hub device that substantially obviates one or more of the problems due to limitations and disadvantages of the related art.

An object of the present invention is to provide a device that functions as a USB hub and has a simple hardware implementation.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a Universal Serial Bus (USB) device, which includes: a logic device adapted for connecting to a USB bus for receiving first bus signals from a host including at least one packet having an address field, the logic device extracting and storing an original address value of the address field and generating a fixed address signal and an address selection signal synchronized to the first bus signals; an analog switch adapted for connecting to the USB bus for receiving the first bus signals and receiving the fixed address signal and address selection signal from the logic device, the analog switch switching between the first bus signal and the fixed address signal according to the address selection signal to generate second bus signals which are identical to the first bus signals except for the address field and any other field whose value depends on a value of the address field, wherein the address field of the second bus signals contains the fixed address signal; a USB device controller connected to the analog switch for receiving the second bus signals and generating third bus signals in response thereto; and a microcontroller unit connected to the USB device controller, the microcontroller unit connected to the logic device for retrieving the stored original address value, the microcontroller unit being loaded with firmware for controlling the USB device controller based on the retrieved original address value.

More generally, the present invention provides a serial bus device which includes: address filtering circuitry adapted for connecting to a serial bus for receiving first bus signals from a host including at least one packet having an address field, the address filtering circuitry extracting and storing an original address value of the address field and generating second bus signals which are identical to the first bus signals except for the address field and any other field whose value depends on the value of the address field, wherein the address field of the second bus signals is a fixed address signal; a serial bus device controller connected to the address filtering circuitry for receiving the second bus signals and generating third bus signals in response thereto; and a microcontroller unit connected to the serial bus device controller, the microcontroller connected to the address filtering circuitry for retrieving the stored original address value, the microcontroller unit being loaded with firmware for controlling the serial bus device controller based on the retrieved original address value.

In another aspect, the present invention provides a method for communication via a serial bus, the method including: (a) receiving first bus signals from a host including at least one packet having an address field; (b) extracting and storing an original address value of the address field; (c) generating second bus signals which are identical to the first bus signals except that the address field is a fixed address signal; (d) retrieving the stored original address value; (e) receiving the second bus signals and generating third bus signals in response thereto; and (f) controlling the generation of the third bus signals based on the retrieved original address value.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
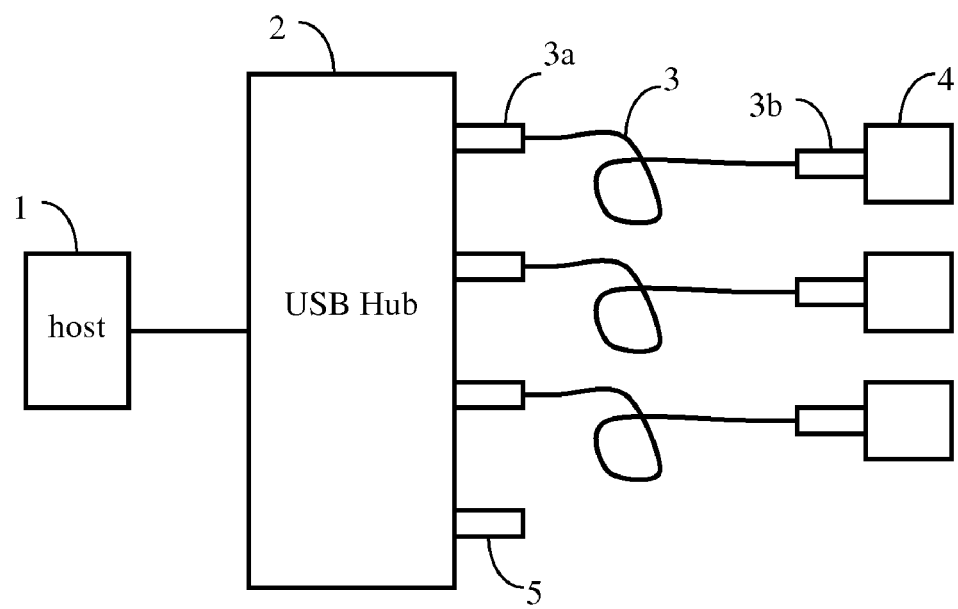
FIG. 1 illustrates a conventional USB hub connected to a host and multiple USB devices connected to the hub.
Figure 2:
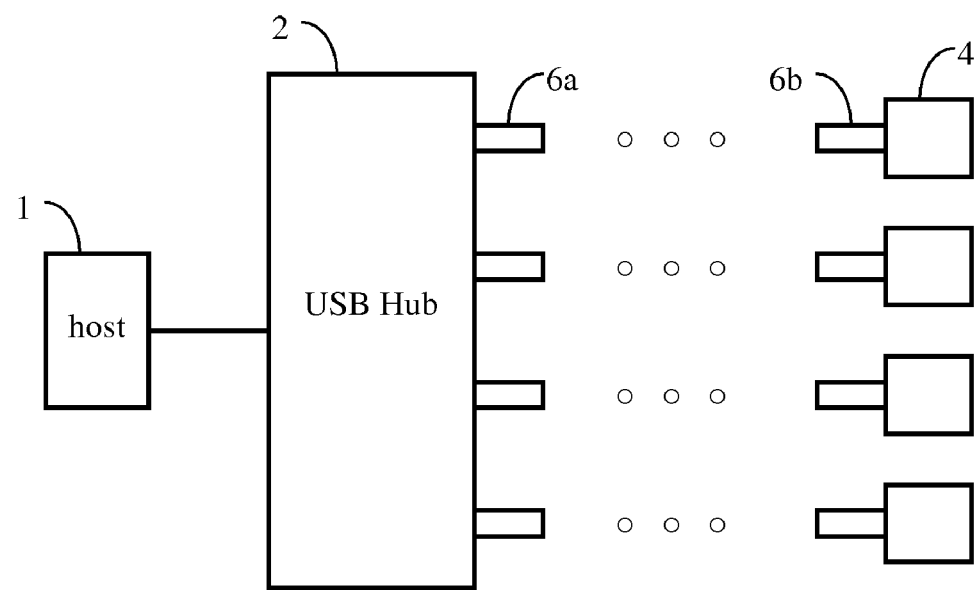
FIG. 2 illustrates a USB hub connected to a host and multiple USB devices each communicating with an end user device via RF signals.

The inventor of the present invention proposed a USB device that has a USB hub and communicates with multiple end user devices wirelessly using RF signals. As shown in FIG. 2, the USB hub 2 connected to a host computer 1 is a conventional USB hub, and multiple USB devices 6a are connected to the USB ports of the hub 2. Each USB device 6a communicates with a corresponding external receiver device 6b using RF signals, and the external receiver device 6b is connected to an end user device 4 via an RS-232 connection.

Figure 3:
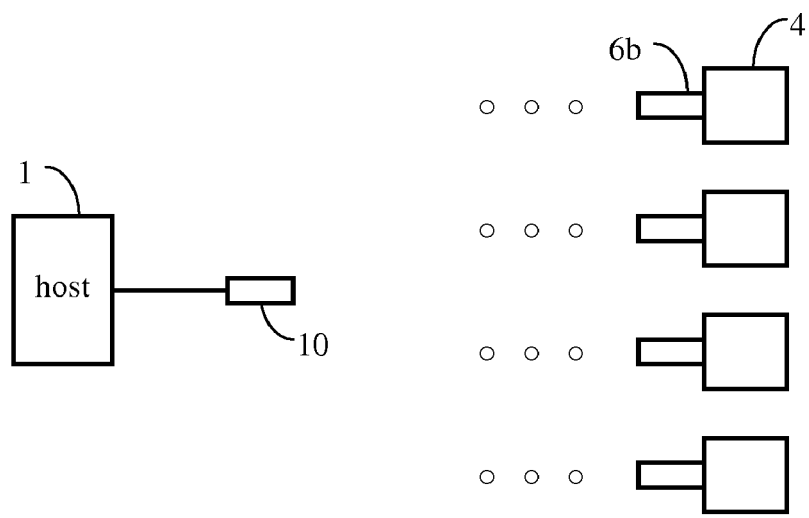
FIG. 3 illustrates a USB device connected to a host and communicating with multiple end user devices via RF signals according to an embodiment of the present invention.

FIG. 3 schematically illustrates a system including a USB device 10 according to an embodiment of the present invention. The USB device 10 is connected to a host computer 1 and communicates with multiple (four in this example) external receiver devices 6b wirelessly, e.g. by using RF signals. Each external receiver device 6b is connected to an end user device 4 via an RS-232 connection or other suitable connections. The USB device 10 has a virtual hub function so that, to the host computer 1, multiple (up to four in this example) USB devices appear to be connected to the host. Thus, for example, a Windows Device Manager on the host computer 1 (a PC) will show multiple USB devices being connected to the PC. Although the USB device 10 is shown in FIG. 3 as being connected directly to the host computer 1, it can also be connected to the host 1 via one or more USB hubs.

Figure 4:
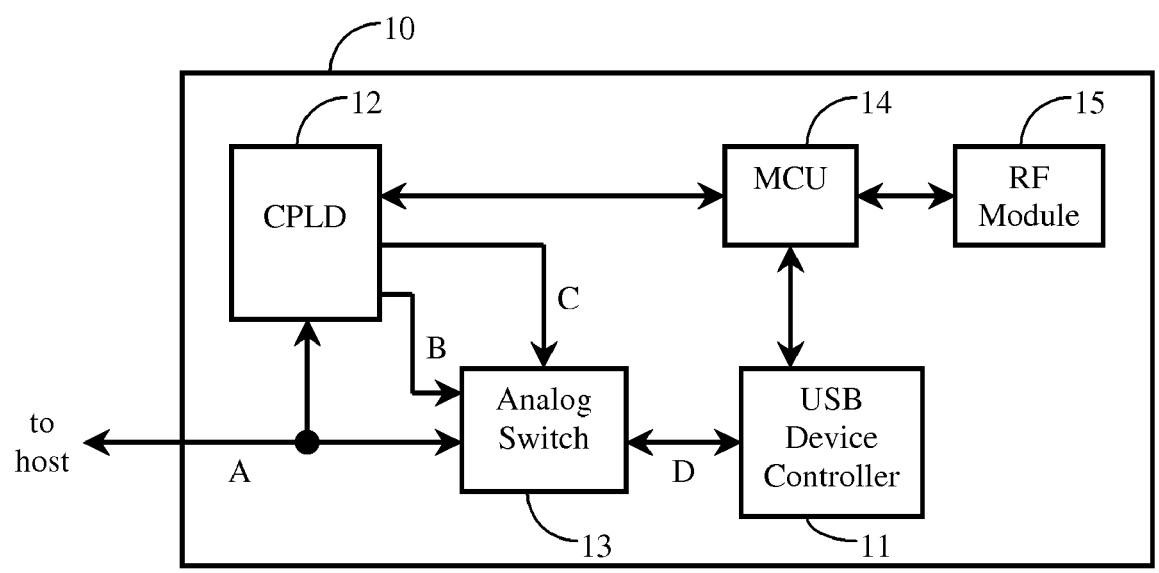
FIG. 4 illustrates the structure of the USB device of FIG. 3 according to an embodiment of the present invention.

FIG. 4 illustrates the structure of the USB device 10 according to an embodiment of the present invention. As shown in FIG. 4, the USB device 10 includes a USB device controller chip 11, a logic device 12 implemented by a CPLD (complex programmable logic device), FPGA (field-programmable gate array) or an ASIC (application-specific IC) (a CPLD is used as an example in the descriptions below), an analog switch 13, a MCU (microcontroller unit) 14 loaded with firmware, and an RF module 15. The USB bus signals A from the host computer 1 is inputted to both the CPLD 12 and the analog switch 13. The CPLD 12 and the analog switch 13 cooperate to perform an address filtering function (described in more detail later), so that the analog switch 13 outputs USB bus signals D that are the same as the original USB bus signals A from the host computer 1 except that the USB device addresses contained in the bus signals A are replaced by a fixed USB device address. The USB device controller 11 receives USB bus signals D (where the USB device address is always the fixed address) and performs appropriate functions of a USB device controller in response thereto, e.g. generating bus signals for the host, under the control of the MCU 14 (described in more detail later). The bus signals generated by the USB device controller 11 are transmitted to the host via the analog switch 13 (as indicated by the left-pointing arrows on the buses between the USB device controller 11 and the analog switch 13 and between the analog switch 13 and the host) without any change in form. The USB device address contained in the original USB bus signals A is stored in the CPLD 12, and the MCU 14 accesses the CPLD 12 to obtain this address in order to control the USB device controller 11. The MCU 14 also controls the RF module 15 to communicate with external receiver devices 6b (see FIG. 3).

Figure 5:
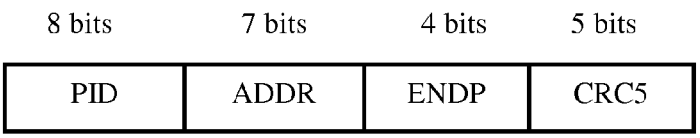
FIG. 5 illustrates an example of a USB bus signal packet.
Figure 6:
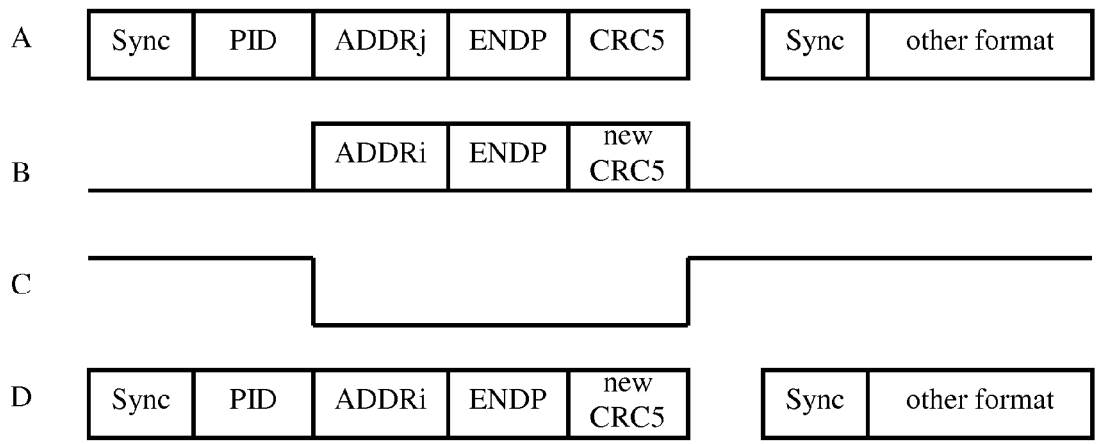
FIG. 6 illustrates the various signals within the USB device of FIG. 3.

An example of a USB bus signal packet is shown in FIG. 5 (the Sync field has been omitted). If the PID (packet identifier) field of the packet is SETUP, IN or OUT (for a token packet), an ADDR (address) field will follow the PID field. Address filtering performed by the CPLD 12 and the analog switch 13 is described with reference to FIGS. 4 and 6. As shown in FIG. 4, the bus signal A from the host is inputted to both the CPLD 12 and the analog switch 13. As shown in FIG. 6, the bus signal A includes a Sync field, a PID field, an address field with a value ADDRj (the address of the virtual hub or a USB device connected thereto with which the host is attempting to communicate), an endpoint field ENDP, and a cyclic redundancy check field CRC5. The CPLD 12 receives the USB bus signal A and generates a USB bus signal B and a selection signal C, both synchronized to the bus signal A, for the analog switch 13. The ADDR field of bus signal B has a value ADDRi, which is a fixed address that has been assigned to the USB device controller 11. The CRC5 field is a new cyclic redundancy check value re-calculated after replacing the address value ADDRj with ADDRi. The other fields of bus signal B may have any value. The selection signal C has a form that causes the analog switch to select the USB bus signal B (the fixed address signal) for at least the ADDR and CRC5 fields. In the example of FIG. 6, the ENDP field of the bus signal B located between the ADDR and CRC5 fields has a value carried from the bus signal A, and the other fields are low; the selection signal C selects the bus signal B for the ADDR, ENDP and CRC5 fields and selects the bus signal A for all other fields (including all packets that do not have an ADDR field). Alternatively (not shown), the selection signal C may select the bus signal A for the ENDP field (in which case the ENDP field of the bus signal B may have any value); however, the selection signal C shown in FIG. 6 may be more desirable because it makes fewer switches. As a result of the switching, the USB bus signal D outputted by the analog switch 13 has a form shown in FIG. 6, which is identical to the bus signal A except that the address ADDRj in the address field has been replaced by ADDRi and the CRC5 field has a newly calculated value. More generally, the bus signal D outputted by the analog switch 13 is identical to the bus signal A except for the address field and any other field whose value depends on the value of the address field. Thus, the USB device controller 11 always receives USB bus signals with the fixed address ADDRi. Meanwhile, the CPLD 12 stores the original address ADDRj contained in the original USB bus signal A form the host, and makes it available to the MCU 14. Using this original address information, the MCU 14 controls the functions of the USB device controller 11 and the RF module 15 to communicate with the desired one of the external receiver devices 6b.

Although in the embodiment of FIG. 4 the CPLD 12 and the analog switch 13 are separate components, any suitable analog and/or digital circuitry (referred to as address filtering circuitry here) may be used to implement the address filtering function performed by the CPLD 12 and the analog switch 13, i.e. extracting and replacing the USB device address contained in the original USB bus signals to generate bus signals D that are the same as the original USB bus signals A from the host except for the address field and any other field whose value depends on the value of the address field.

Figure 7:
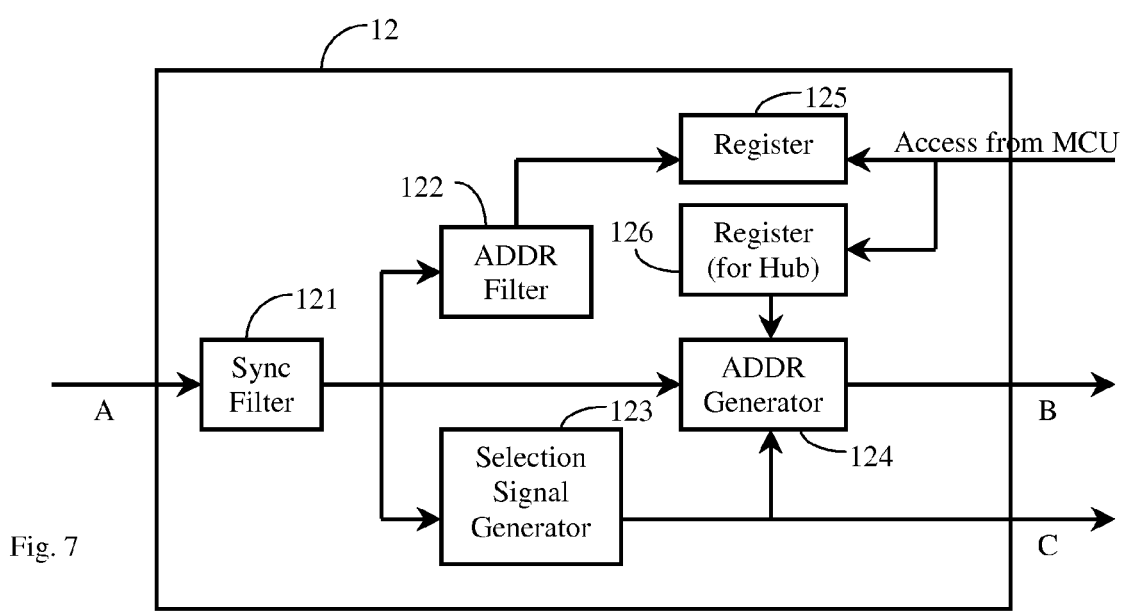
FIG. 7 illustrates the structure of the CPLD of the USB device of FIG. 3.

The structure of the CPLD 12 is schematically shown in FIG. 7. A sync filter 121 receives the bus signal A from the host 1 and detects the Sync field in the packets. If the Sync field is followed by one of the three PID values IN, OUT or SETUP, the sync filter 121 outputs the packet unchanged. If the PID is not one of the above three values, the sync filter 121 outputs no signal. A selection signal generator 123 receives the output of the sync filter 121 and generates the selection signal C shown in FIG. 6. An address filter 122 receives the output of the sync filter 121 and extracts the USB device address value ADDRj from it. The address value ADDRj is stored in a register 125. Meanwhile, an address generator 124 generates the USB bus signal B shown in FIG. 6 using the fixed address value ADDRi which has been stored in a register 126. The address generator 124 also re-calculates the CRC5 field using the address value ADDRi and values of other fields in the signals received from the sync filter 121 (according to the USB specification, the CRC5 value is calculated from the ADDR field and the ENDP field values). The address generator 124 may also receive the selection signal C to obtain correct timing for the bus signal B. Alternatively, the address generator 124 may use the output signal of the sync filter 121 to obtain correct timing. The registers 125 and 126 are accessible by the MCU 14. Although in the illustrated example (FIGS. 4 and 7) a CPLD is used to implement the functions of fixed address generation and address selection signal generation, more generally, any suitable logic device may be used to implement these functions, such as an FPGA or ASIC. Thus, more generally, the component 12 in FIG. 4 is a logic device for receiving the bus signals from the host (signal A) and generating a fixed address signal (signal B) and an address selection signal (signal C) for the analog switch 13.

Figure 8:
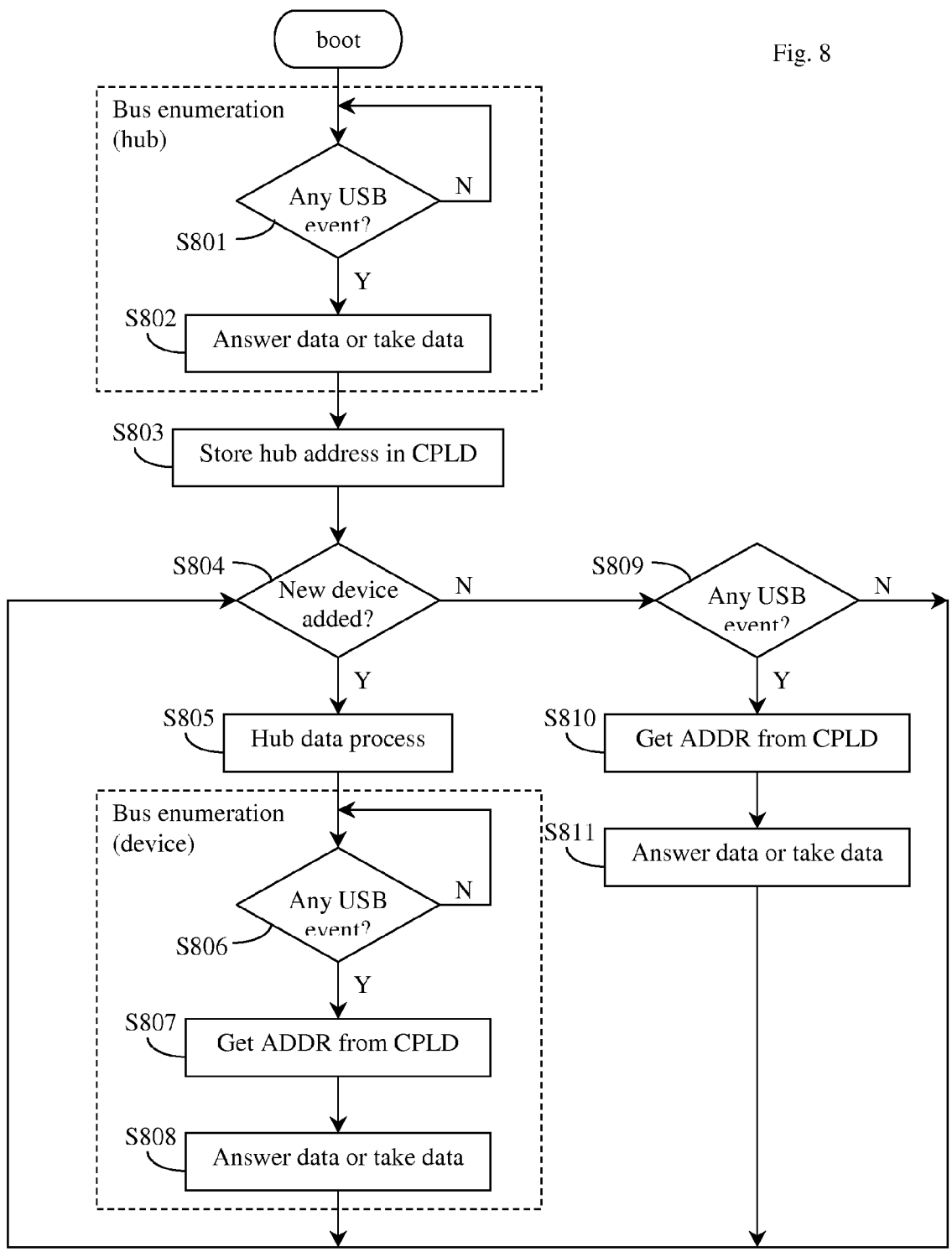
FIG. 8 is a flow chart illustrating a process executed by the MCU of the USB device of FIG. 3.

The MCU 14 controls the USB device controller 11 to communicate with the host 1, including carrying out both system configuration processes, e.g., when the USB device 10 is attached to the host 1 (either directly, or indirectly via another hub) or when an external receiver device 6b is added to or removed from the system, and normal data communication between the external receiver devices 6b and the host 1. The MCU 14 is programmed such that the communication between the USB device controller 11 and the host 1 complies with the appropriate USB standard(s). FIG. 8 is a flow chart that illustrates a process performed by the MCU 14 executing firmware loaded therein. As shown in FIG. 8, after the USB device 10 is physically connected to the USB system (i.e. plugged into a USB port connected to the host), the MCU 14 executes a bus enumeration process for the hub (steps S801 and S802), by which the host assigns an address ADDRi to the hub. The ADDRi is stored in the CPLD 12 as the fixed address (step S803). Subsequently, when a new device (e.g. an external receiver device 6b with the associated end user device 4) is added to the system, the MCU executes a bus enumeration process for the device (steps S806-S808), by which the host assigns an address ADDRj to the new device. Subsequently, when the host 1 communicates with the device having the address ADDRj, the CPLD 12 and the analog switch 13 filter the address field of the bus signal so that the packets received by the USB device controller 11 have the fixed address ADDRi, and the MCU 14 obtains the original address ADDRj that is stored in the CPLD 12 to control the USB device controller 11.

More specifically, in step S801 (after the USB device 10 is connected to the host), the MCU 14 monitors any USB event received by the USB device controller 11 from the host 1. Such USB events would be communications from the host relevant to the bus enumeration process. Bus enumeration is described in the Universal Serial Bus Specification, Revision 2.0, Apr. 27, 2000 ("the USB 2.0 Specification," which is incorporated herein by reference), Sections 4.6 and 9.1.2. The MCU 14 controls the USB device controller 11 to simulate a hub, by responding to the host 1 or taking data sent by the host in the bus enumeration process as appropriate (step S802). The address ADDRi assigned to the hub by the host in this bus enumeration process is stored in the CPLD 12 (e.g., in the register 126 shown in FIG. 7) as the fixed USB device address (step S803).

After the bus enumeration process for the hub is completed, the MCU 14 monitors any signals from the RF module 15 that indicates the addition of a new USB device to the hub (step S804), as well as any USB event received by the USB device controller 11 from the host 1 (step S809). If a new device is added to the hub ("Y" in step S804), the MCU 14 controls the USB device controller 11 to execute an appropriate hub data process by which the hub informs the host of the attachment of a USB device on one of its ports. For example, under the USB 2.0 standard, the hub has status bits that are used to report the attachment or removal of a USB device on one of its ports, and the host queries the hub to retrieve these bits. The host will then initiates a bus enumeration process for the new device. The MCU 14 now controls the USB device controller 11 to simulate the newly added USB device, by responding to the host 1 or taking data sent by the host in the bus enumeration process as appropriate (step S808). In the bus enumeration process, while the USB device controller 11 always receives packets having the fixed address ADDRi, the MCU 14 obtains from the CPLD 12 the address ADDRj contained in the original packets from the host (i.e. the address of the USB device the host intends to communicate with) (step S807), so that the MCU can control the USB device controller 11 to simulate the appropriate one of the USB devices.

When a USB event is received by the USB device controller 11 from the host 1 ("Y" in step S809), the MCU 14 controls the USB device controller 11 to simulate the intended USB device (i.e. the USB device the host intends to communicate with) (steps S810 and S811). Here, again, while the USB device controller 11 always receives packets having the fixed address ADDRi, the MCU 14 obtains from the CPLD 12 the address ADDRj contained in the original packets from the host (i.e. the address of the intended USB device) (step S810), and control the USB device controller 11 to simulate the USB device with address ADDRj by responding to the host or taking data sent by the host (step S811).

Although not specifically shown in FIG. 8, the MCU 14 can also handle removal of USB devices from the hub.

Using the structures and methods described above, the USB device 10 can simulate one or more USB hubs and one or more USB devices. It supports USB devices attaching to and detaching from the USB system at any time in compliance with the USB standard.

USB 2.0 is used as an exemplary communication protocol in the description above, but those skilled in the relevant art will recognize that the invention applies to other serial bus communication protocols with modifications as appropriate.

Although FIGS. 3 and 4 show the USB device 10 communicating with external devices 6b wirelessly using RF signals, any suitable communication means may be used, including wired and wireless communication means.

Although the embodiment illustrated in FIG. 4 uses separate circuits for the various components, the combined functionalities of some or all of the illustrated components may be implemented by a single circuit component such as an ASIC. In this regard, the various components recited in the appended claims may correspond to functional portions of one or more circuit such as ASIC(s).

It will be apparent to those skilled in the art that various modification and variations can be made in the USB device that uses one USB device controller to simulate multiple virtual USB devices with a virtual USB hub of the present invention as well as the related methods without departing from the spirit or scope of the invention. Thus, it is intended that the present invention cover modifications and variations that come within the scope of the appended claims and their equivalents.

What is claimed is:

1. A serial bus device comprising:
   address filtering circuitry adapted for connecting to a serial bus for receiving first bus signals from a host including at least one packet having an address field, the address filtering circuitry extracting and storing an original address value of the address field and generating second bus signals which are identical to the first bus signals except for the address field and any other field whose value depends on a value of the address field, wherein the address field of the second bus signals contains a fixed address value which is different from the original address value;
   a serial bus device controller connected to the address filtering circuitry for receiving the second bus signals having the address field containing the fixed address value, and performing a function in response thereto; and a microcontroller unit connected to the serial bus device controller, the microcontroller unit connected to the address filtering circuitry for retrieving the stored original address value, the microcontroller unit being loaded with firmware for controlling the function of the serial bus device controller based on the retrieved original address value, wherein the serial bus device controller is controlled by the microcontroller to simulate a serial bus device having an address equal to the original address value which is different from the fixed address value contained in the second bus signals received by the serial bus device controller.

2. The device of claim 1, wherein the address filtering circuitry comprises:

a logic device adapted for connecting to the serial bus for receiving the first bus signals, the logic device extracting and storing the original address value of the address field and generating a fixed address signal containing the fixed address value and an address selection signal synchronized to the first bus signals; and an analog switch adapted for connecting to the serial bus for receiving the first bus signals and receiving the fixed address signal and address selection signal from the logic device, the analog switch switching between the first bus signals and the fixed address signal according to the address selection signal to generate the second bus signals.

3. The device of claim 2, wherein the logic device is implemented by a complex programmable logic device (CPLD), a field-programmable gate array (FPGA), or an application-specific IC (ASIC).

4. The device of claim 2, wherein the logic device comprises:

a sync filter for receiving the first bus signals and detecting a Sync field in the packets;

a selection signal generator connected to an output of the sync filter for generating the address selection signal;

an address filter connected to the output of the sync filter for extracting the original address value of the address field of the first bus signals;

a first register for storing the extracted original address value;

a second register for storing the fixed address value; and an address generator for generating the fixed address signal using the fixed address value stored in the second register.

5. The device of claim 1, wherein the serial bus device controller is adapted to communicate with the host using a Universal Serial Bus (USB) protocol.

6. The device of claim 5, wherein the microcontroller unit controls the serial bus device controller to simulate one or more USB hubs and one or more USB devices.

7. The device of claim 6, wherein the microcontroller unit controls the serial bus device controller to carry out USB bus enumeration processes.

8. The device of claim 1, further comprising a communication module connected to the microcontroller unit for communicating with one or more external receiver devices wirelessly, whereby the external receiver devices communicate with the host via the serial bus device controller.

9. The device of claim 8, wherein the communication module is an RF module for communicating with the external receiver devices using RF signals.

10. A method for communication via a serial bus, comprising:

(a) receiving first bus signals from a host including at least one packet having an address field;

(b) extracting and storing an original address value of the address field of the first bus signals;

(c) generating second bus signals which are identical to the first bus signals except for the address field and any other field whose value depends on a value of the address field, wherein the address field of the second bus signals contains a fixed address value which is different from the original address value;

(d) a microcontroller retrieving the stored original address value;

(e) a serial bus device controller receiving the second bus signals having the address field containing the fixed address value; and (f) based on the retrieved original address value, the microcontroller controlling the serial bus device controller to simulate a serial bus device having an address equal to the original address value which is different from the fixed address value contained in the second bus signals received by the serial bus device controller.

11. The method of claim 10, wherein step (c) includes:

(c1) generating a fixed address signal containing the fixed address value and an address selection signal synchronized to the first bus signals; and (c2) switching between the first bus signals and the fixed address signal according to the address selection signal to generate the second bus signals.

12. The method of claim 10, wherein the first and second bus signals are Universal Serial Bus (USB) signals.

13. The method of claim 12, wherein step (f) includes simulating one or more USB hubs and one or more USB devices.

14. The method of claim 13, wherein step (f) includes carrying out USB bus enumeration processes.

15. The method of claim 10, further comprising:

communicating with one or more external receiver devices wirelessly, whereby the external receiver devices communicate with the host.

16. A Universal Serial Bus (USB) device comprising:

a logic device adapted for connecting to a USB bus for receiving first bus signals from a host including at least one packet having an address field, the logic device extracting and storing an original address value of the address field and generating a fixed address signal containing a fixed address value and an address selection signal synchronized to the first bus signals;

an analog switch adapted for connecting to the USB bus for receiving the first bus signals and receiving the fixed address signal and address selection signal from the logic device, the analog switch switching between the first bus signals and the fixed address signal according to the address selection signal to generate second bus signals which are identical to the first bus signals except for the address field and any other field whose value depends on a value of the address field, wherein the address field of the second bus signals contains the fixed address value;

a USB device controller connected to the analog switch for receiving the second bus signals and performing a function in response thereto; and a microcontroller unit connected to the USB device controller, the microcontroller unit connected to the logic device for retrieving the stored original address value, the microcontroller unit being loaded with firmware for controlling the function of the USB device controller based on the retrieved original address value.

17. The device of claim 16, wherein the logic device is implemented by a complex programmable logic device (CPLD), a field-programmable gate array (FPGA), or an application-specific IC (ASIC).

18. The device of claim 16, wherein the logic device comprises:

a sync filter for receiving the first bus signals and detecting a Sync field in the packets;

a selection signal generator connected to an output of the sync filter for generating the address selection signal;

an address filter connected to the output of the sync filter for extracting the original address value of the address field of the first bus signals;

a first register for storing the extracted original address value;

a second register for storing the fixed address value; and an address generator for generating the fixed address signal using the fixed address value stored in the second register.

19. The device of claim 16, wherein the microcontroller unit controls the USB device controller to simulate one or more USB hubs and one or more USB devices.

20. The device of claim 16, further comprising a communication module connected to the microcontroller unit for communicating with one or more external receiver devices wirelessly, whereby the external receiver devices communicate with the host via the USB device controller.

* * * * *